United States Patent [19]
Ogino et al.

[11] Patent Number: 5,488,101
[45] Date of Patent: Jan. 30, 1996

[54] TRISAZO COMPOUNDS, METHOD FOR DYEING FIBER MATERIALS, PAPER OR LEATHER USING THE SAME AND INKS CONTAINING THE SAME

[75] Inventors: Kazuya Ogino, Minoo; Kingo Akahori, Toyonaka; Naoki Harada, Ibaraki; Yutaka Kayane, Ikoma; Hideo Kawashita, Minoo; Mituhiro Ohta, Osaka, all of Japan

[73] Assignee: Sumitomo Chemical Company, Limited, Osaka, Japan

[21] Appl. No.: 894,561

[22] Filed: Jun. 5, 1992

[30] Foreign Application Priority Data

Jun. 10, 1991 [JP] Japan ................. 3-138010

[51] Int. Cl.$^6$ .................. C09B 35/46; C09B 62/513; C09D 11/02; D06P 1/384
[52] U.S. Cl. .................. 534/680; 534/642; 534/685; 534/810; 534/815; 8/437; 8/549; 8/917; 8/918; 8/919; 8/924; 106/22 K
[58] Field of Search .................. 534/685, 678, 534/810, 815, 642, 680; 8/437, 549, 917, 918, 919, 924

[56] References Cited

U.S. PATENT DOCUMENTS

| | | | |
|---|---|---|---|
| 4,479,906 | 10/1984 | Zeidler et al. | 534/815 X |
| 4,767,459 | 8/1988 | Greenwood et al. | 534/815 X |
| 5,110,917 | 5/1992 | Bauer et al. | 534/815 |

FOREIGN PATENT DOCUMENTS

| | | |
|---|---|---|
| 0267677 | 5/1988 | European Pat. Off. . |
| 0312004 | 4/1989 | European Pat. Off. . |
| 0408192 | 1/1991 | European Pat. Off. . |
| 0471233 | 2/1992 | European Pat. Off. . |
| 943662 | 5/1956 | Germany . |
| 64-79276 | 3/1989 | Japan . |

OTHER PUBLICATIONS

Fleishauer et al., Chemical Abstracts, vol. 52, No. 17731 f,g,h (1956).
Suga et al, Chemical Abstracts, vol. 111, No. 196993d, "Waterproof and light- and feathering-resistant inks for jet-printing", (1989).
Beech, "Fibre-Reactive Dyes", Logos Press Limited, London (1970) pp. 212–218 and 226.

*Primary Examiner*—Johann Richter
*Assistant Examiner*—Fiona T. Powers
*Attorney, Agent, or Firm*—Stevens, Davis, Miller & Mosher

[57] ABSTRACT

Herein is provided a trisazo compound represented by formula (I) in the free acid form:

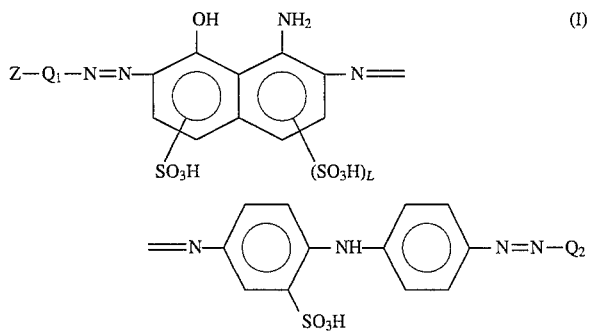

wherein $Q_1$ is an unsubstituted or substituted phenylene or naphthylene group, $Q_2$ is an unsubstituted or substituted phenyl or naphthyl group, Z is —SO$_2$CH$_2$CH$_2$OH or —SO$_2$CH$_2$CH$_2$SO$_3$H group, and L is 0 or 1. The trisazo compound provided herein is excellent in solubility and gives deep colored dyed product or image when used in dyeing or printing, so that it is useful as a dye and an ink. Herein are also provided a method for dyeing fiber materials, paper or leather by using said trisazo compound, and an ink containing said trisazo compound.

17 Claims, No Drawings

TRISAZO COMPOUNDS, METHOD FOR DYEING FIBER MATERIALS, PAPER OR LEATHER USING THE SAME AND INKS CONTAINING THE SAME

The present invention relates to trisazo compounds, a method for dyeing fiber materials, paper or leather using the trisazo compounds and inks containing the trisazo compounds. More particularly, the present invention relates to trisazo compounds, a method for dyeing hydroxy group- or amino group-containing fiber materials, paper or leather into a black color, and inks containing the trisazo compounds.

A compound represented by the following formula:

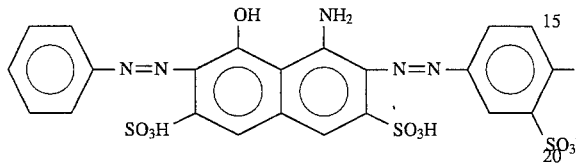

is disclosed as C.I. Direct Black 168. An ink containing the compound is mentioned in U.S. Pat. No. 4767459.

Polyazo direct or acid dyes prepared from benzidine or its derivatives have hitherto been used for dyeing fiber materials having hydroxy or amino group. However, production of benzidine used as a starting material of these dyes is prohibited, and benzidine derivatives exemplified by o-tolidine and dianisidine are registered as special chemical substances of which handling is restricted in the production of these dyes, because of their toxicity. For such a reason, a variety of compounds have been proposed as non-benzidine type dyes. However, none of them have yet satisfied the requirements of users in the dye abilities.

C.I. Direct Black 168 is also one proposed as a non-benzidine dye. However, if used for dyeing fiber materials or paper, it cannot give a deep black color because of inferiority in build-up property. Further, it is unsatisfactory in solubility, among the various performances required of an ink. Particularly when used as an ink for ink jet process, it causes clogging of nozzle due to deposition of dye. Thus, it is unsatisfactory from the viewpoint of performances.

The present inventors have undertaken extensive studies with the aim of solving the above-mentioned problem. As the result, compounds capable of satisfying the necessary conditions of a dye and an ink and producible without using benzidine nor its derivative as a starting material were found. Based on this finding, the present invention was accomplished.

The present invention provides a trisazo compound represented by the following formula (I) in the free acid form:

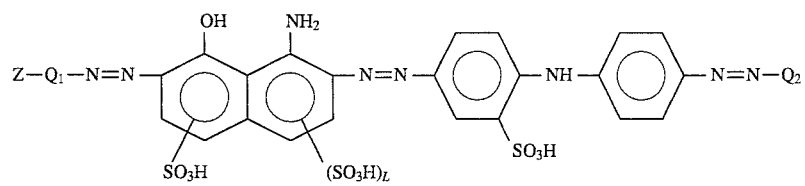

wherein $Q_1$ is an unsubstituted or substituted phenylene or naphthylene group, $Q_2$ is an unsubstituted or substituted phenyl or naphthyl group, $Z$ is $-SO_2CH_2CH_2OH$ or $-SO_2CH_2CH_2SO_3H$ group, and $L$ is 0 or 1, a method for dyeing fiber materials, paper or leather using said compound, and an ink containing said compound.

The present invention also provides a method for producing a trisazo compound represented by formula (I), which is characterized in that a compound represented by the following formula (X) in the free acid form:

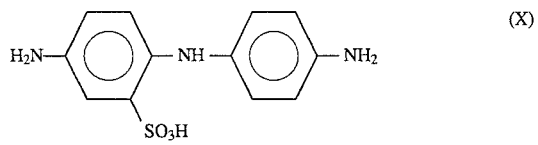

is tetrazotized in the usual manner followed by coupling with a compound represented by the following formula (XI) in the free acid form:

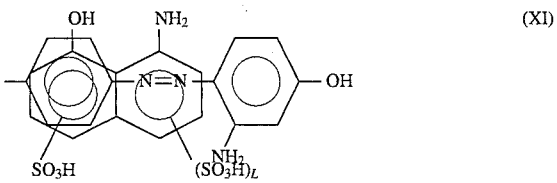

wherein L is as defined above, in an aqueous medium under an acidic condition, the product of the coupling reaction is coupled in a neutral or weakly alkaline aqueous medium with a diazonium compound prepared by diazotizing a compound of the following formula (XII) in the usual manner:

$$Z-Q_1-NH_2 \quad (XII)$$

wherein $Q_1$ and Z are as defined above, and the disazodiazo compound thus obtained is coupled with a compound represented by the following formula (XIII):

$$Q_2-H \quad (XIII)$$

wherein $Q_2$ is as defined above, in a weakly alkaline aqueous medium.

When $Q_1$ in formula (I) is an unsubstituted or substituted phenylene group, it is preferably a phenylene group represented by the following formula (II)

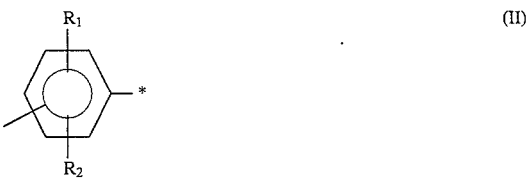

wherein $R_1$ and $R_2$ independently of one another are each hydrogen, chlorine or bromine atom or alkyl, alkoxy, sulfo or carboxy group; and the mark * means that the bond links to an azo group (hereinafter the same). Among these phenylene groups, those represented by the following formula (III) or formula (IV) are particularly preferable:

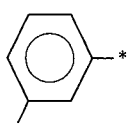

In formula (II), examples of the alkyl group represented by $R_1$ and $R_2$ include methyl, ethyl, propyl and butyl groups and examples of the alkoxy group include methoxy, ethoxy, propoxy and butoxy groups.

When $Q_1$ in formula (I) is an unsubstituted or substituted naphthylene group, it is preferably a naphthylene group represented by the following formula (V):

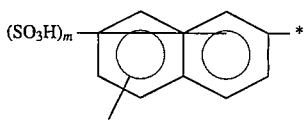

wherein m is 0, 1 or 2. Among these naphthylene groups, those represented by the following formula (VI) are particularly preferable:

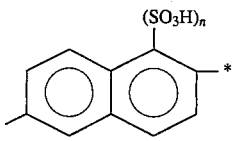

wherein n is 0 or 1.

When $Q_2$ in formula (I) is an unsubstituted or substituted phenyl group, it is preferably (1) a phenyl group substituted once, twice or thrice by hydroxy group and additionally substituted or unsubstituted by substituted or unsubstituted amino, sulfo, alkyl, alkoxy or carboxy group or (2) a phenyl group substituted once or twice by substituted or unsubstituted amino group and additionally substituted or unsubstituted by hydroxy, sulfo, alkyl, alkoxy or carboxy group. As examples of said substituted amino group, amino groups substituted by methyl, ethyl, hydroxyethyl, cyanoethyl, acetyl or carbamoyl group can be referred to. As examples of said alkyl and alkoxy groups, methyl, ethyl, methoxy, ethoxy and the like can be referred to.

The phenyl groups particularly preferable as $Q_2$ are those represented by the following formulas (VII) and (VIII):

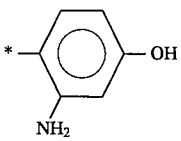

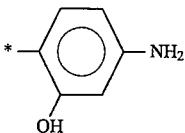

When $Q_2$ in formula (I) is an unsubstituted or substituted naphthyl group, it is preferably (1) a naphthyl group substituted once or twice by hydroxy group and additionally substituted or unsubstituted by substituted or unsubstituted amino group or sulfo group or (2) a naphthyl group substituted once or twice by substituted or unsubstituted amino group and additionally substituted or unsubstituted by hydroxy or sulfo group. As examples of the substituted amino group in the above-mentioned case (1), amino groups substituted by methyl, acetyl, phenyl, sulfophenyl, disulfophenyl or benzoyl group can be referred to. As examples of the substituted amino group in the case of (2), amino groups substituted by methyl, ethyl, hydroxyethyl, cyanoethyl, acetyl or carbamoyl group can be referred to.

Among the trisazo compounds represented by formula (I), those having a preferable 1-amino-8-naphthol ring are represented by the following formula (IX):

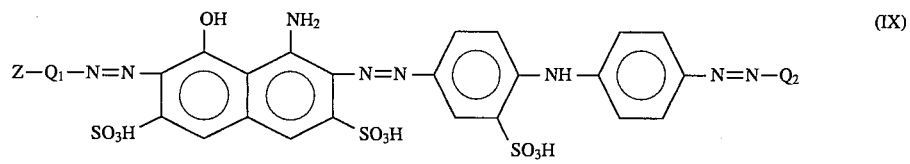

wherein $Q_1$, $Q_2$ and Z are as defined above.

The trisazo compounds of the present invention are in the form of a free acid or a salt. Preferably, they are in the form of alkali metal salt, ammonium salt or organic amine salt. As the alkali metal, lithium, sodium or potassium can be referred to. As the organic amine, monoethanolamine, diethanolamine or triethanolamine can be referred to.

The trisazo compound represented by formula (I) can be produced in the following manner, for example.

Thus, a compound represented by the following formula (X) in the free acid form:

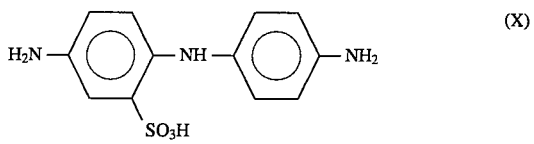

is tetrazotized in the usual manner, and then the tetrazotized compound is coupled with a compound represented by the following formula (XI) in the free acid form:

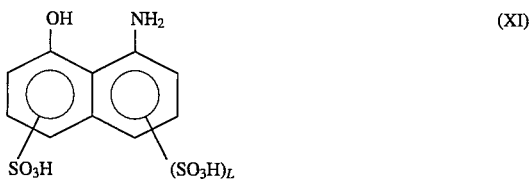

wherein L is as defined above, in an aqueous medium under an acidic condition to form a diazonium compound. Then, the diazonium compound is coupled in a neutral or weakly alkaline aqueous medium with a diazonium compound prepared by diazotizing a compound of the following formula (XII) in the usual manner:

$$Z-Q_1-NH_2 \quad \text{(XII)}$$

wherein $Q_1$ and Z are as defined above. Then, the compound obtained by the coupling is further coupled with a compound represented by the following formula (XIII):

Q₂—H    (XIII)

wherein Q₂ is as defined above, in a weakly alkaline aqueous medium to form a trisazo compound represented by formula (I).

Examples of the compound represented by formula (XI) include 1-amino-8-naphthol-5-sulfonic acid and 1-amino-8-naphthol-3,6- or 4,6-disulfonic acid, among which 1-amino-8-naphthol-3,6-disulfonic acid is preferable.

As examples of the compound represented by formula (XII), the following compound can be referred to:

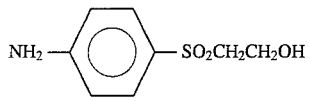

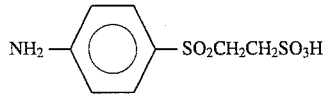

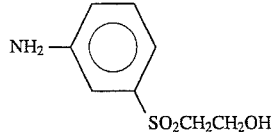

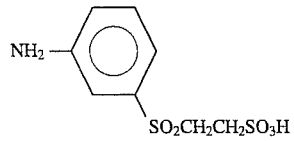

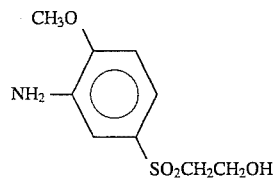

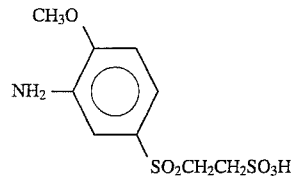

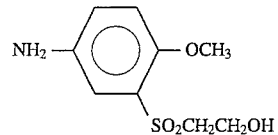

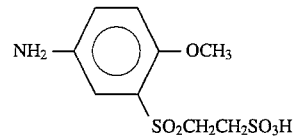

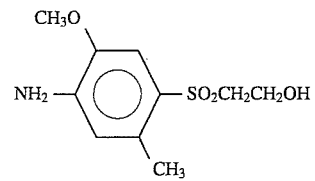

-continued

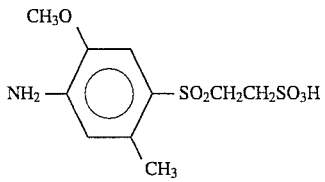

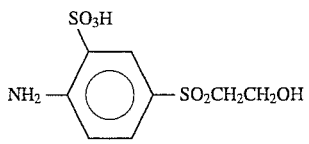

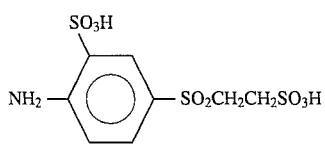

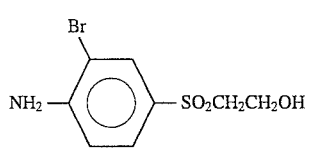

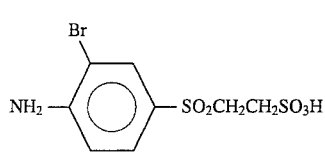

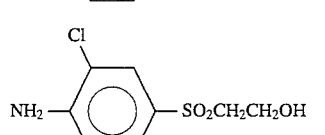

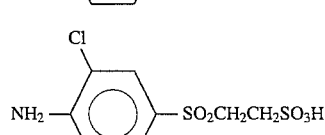

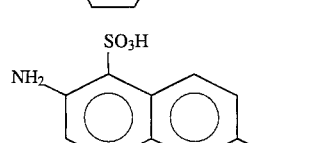

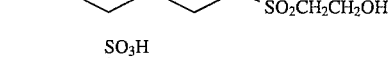

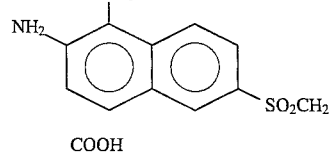

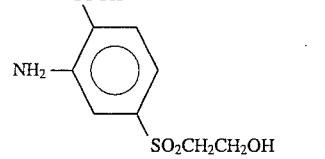

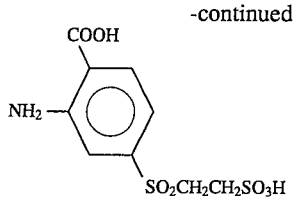
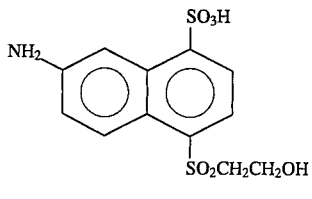
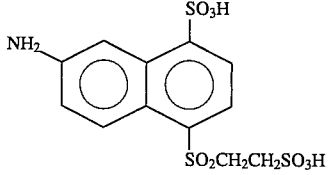
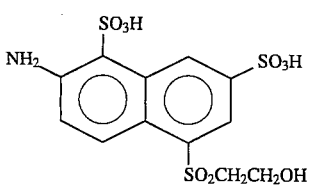
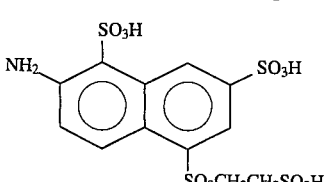
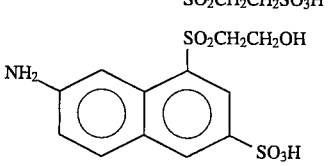
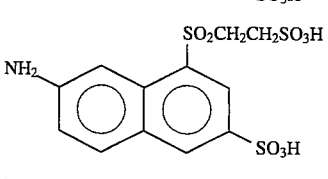
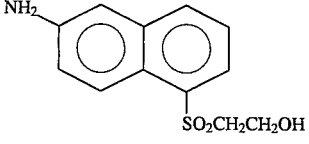
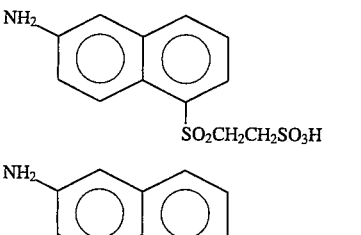
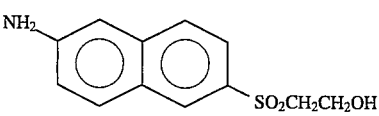

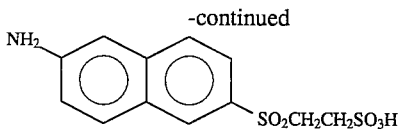

Among them, the following compounds are particularly preferable:

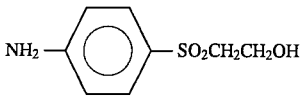
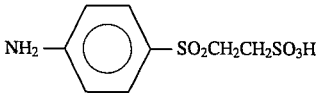
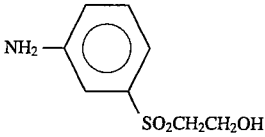
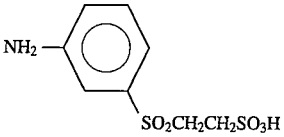
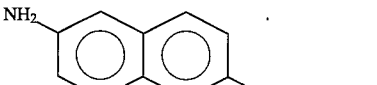
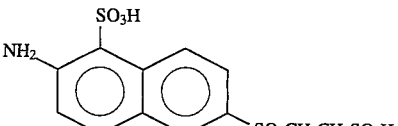

As examples of the compound represented by formula (XIII), aniline derivatives, phenol derivatives, aminophenol derivatives, naphthol derivatives, naphthylaminesulfonic acid derivatives, naphtholsulfonic acid derivatives and the like can be referred to.

Among them, preferable are 1-hydroxybenzene, 1-hydroxy-2-, 3- or 4-methylbenzene, 1,3-dihydroxybenzene, 1-hydroxy-3-methoxybenzene, 1-hydroxy3-aminobenzene, 3-di(β-hydroxyethyl)amino-1-hydroxybenzene, 1-di(β-hydroxyethyl)aminobenzene, 1,3-diamino-4-methylbenzene, 1-hydroxy-2-benzoic acid, 1,3-diaminobenzene-6-sulfonic acid, 1-acetylamino-4-methoxy3-di(β-hydroxyethyl)aminobenzene, 3-diethylamino-1hydroxybenzene, 1-hydroxynaphthalene, 1-hydroxynaphthalene-4-, 5- or 3-sulfonic acid, 1-hydroxynaphthalene-3,8- or 3,6-disulfonic acid, 1-hydroxynaphthalene-3,6,8-trisulfonic acid, 2hydroxynaphthalene, 2-hydroxynaphthalene-8-, 7- or 6-sulfonic acid, 2-hydroxynaphthalene-6,8- or 3,6-disulfonic acid, 2-amino-, methylamino-, ethylamino-, acetylamino-, propionylamino-, benzoylamino-, carbamoylamino-, sulfamoylamino- or phenylamino-8-hydroxynaphthalene-6-sulfonic acid, 3-amino-, methylamino-, ethylamino-, propionylamino-, acetylamino-, benzoylamino-, carbamoylamino-, sulfamoylamino- or phenylamino-8-hydroxynaphthalene-6-sulfonic acid, 1-amino- or acetylamino-8-hydroxynaphthalene-3,6-disulfonic acid, 1-amino- or acetylamino-8-hydroxynaphthalene-4,6-disulfonic acid, 1-amino-8-hydroxynaphthalene-2,4-disulfonic acid, 1,8-dihydroxynaphthalene-3,6-disulfonic acid and the like.

Among these compounds, 1-hydroxy-3-aminobenzene is particularly preferable.

The trisazo compound of the present invention is usable either singly or in the form of a mixture, and useful particularly for dyeing and printing cellulose fibers such as rayon, cotton and the like, paper, leather, silk, synthetic polyamide and the like. The dyeing can be carried out by various dyeing processes such as exhaustion dyeing process and the like. Since the trisazo compound of the present invention exhibits a good solubility ability and a high fixation property, it can give a deep black colored dyed product. Particularly when used for dyeing paper, it exhibits a good build-up property and gives a dyed product of excellent fastness. Thus, the trisazo compound of the present invention exhibits excellent performances in the dyeing and printing mentioned above, and is useful as a black colored dye.

Further, the trisazo compound of the present invention is usable also as a stable liquid composition. The liquid composition is particularly suitable for dyeing rayon and paper.

Further, the trisazo compound of the present invention is usable, either singly or in the form of a mixture, as an ink applicable to the ink jet process which utilizes piezoelectric vibrator or thermal energy. Further, if desired, it can be used in combination with prior dyes conventionally used for the ink jet process, such as C.I. Direct Black 154 and the like. As an ink, it can be applied to aqueous ink. The aqueous ink is a composition comprising a water-soluble organic solvent and water. Examples of said water-soluble organic solvent include $C_1$–$C_4$ alkanols such as methanol, ethanol, n-propanol, isopropanol, n-butanol, s-butanol, t-butanol and isobutanol; amides such as dimethylformamide, diethylformamide and N-methylpyrrolidone; ketones and ketone alcohols such as acetone and diacetone alcohol; ethers such as tetrahydrofuran and dioxane; polyalkylene glycols such as polyethylene glycol and polypropylene glycol; alkylene glycols and thioglycols having $C_2$–$C_6$ alkylene group such as ethylene glycol, propylene glycol, butylene glycol, tri- ethylene glycol, thiodiglycol, hexylene glycol and diethylene glycol; other polyols such as glycerol and 1,2,6-hexanetriol; lower alkyl ethers of polyhydric alcohols such as 2-methoxyethanol, 2-(2-methoxyethoxy)ethanol, 2-(2-ethoxyethoxy)ethanol, 2-[2-(2-methoxyethoxy)ethoxy]ethanol and 2-[2-(2-ethoxyethoxy)ethoxy]ethanol; alkanolamines such as monoethanolamine, diethanolamine and triethanolamine; and the like. These water-soluble organic solvents can be used either singly or in the form of a mixture of two or more members unless they exercise an adverse influence one another.

The trisazo compound represented by formula (I) is used usually in an amount of 0.5–20 parts by weight and preferably in an amount of 1–15 parts by weight, in 100 parts by weight of ink.

To the aqueous ink may be added a rotproofing or mildew-proofing agent such as sodium dehydroacetate, dicyclohexyl nitrite and the like, as well as other various additives such as ultraviolet absorber, infrared absorber, viscosity regulator, surface tension regulator, pH regulator, resistivity regulator, penetrant and the like.

The aqueous ink can easily be prepared by dissolving a trisazo compound represented by formula (I), a water-soluble organic solvent and various additives in cold water or hot water and, directly or after cooling the resulting solution, filtering it through a membrane filter of very fine pore size.

The trisazo compound of the present invention is excellent in solubility. Accordingly, it is good in storage stability and free from clogging of nozzle caused by deposition. Further, the ink using the trisazo compound of the present invention gives a deep black-colored image excellent in clarity, water resistance, light resistance, etc.

Next, the present invention will be illustrated in more detail by way of the following examples. In the examples, parts are by weight.

EXAMPLE 1

4,4'-Diaminodiphenylamine-2-sulfonic acid (27.9 parts) was tetrazotized in a conventional manner, and the tetrazo compound thus obtained was coupled with 31.9 parts of 1-amino-8-naphthol-3,6-disulfonic acid at 0°–5° C. under an acidic condition. Then, a diazotized compound prepared by diazotizing 20.1 parts of 4-hydroxyethylsulfonyl-1-aminobenzene in a conventional manner was poured thereinto and coupled at 0°–10° C. under a weakly alkaline condition. Further, 10.9 parts of 1-hydroxy-3-aminobenzene was added and the coupling reaction was completed under an alkaline condition. Then, the product was salted out and isolated in a conventional manner to obtain a trisazo compound represented by the following formula in the free acid form. As measured in an aqueous medium, $\lambda_{max}$ of this trisazo compound was 625 nm.

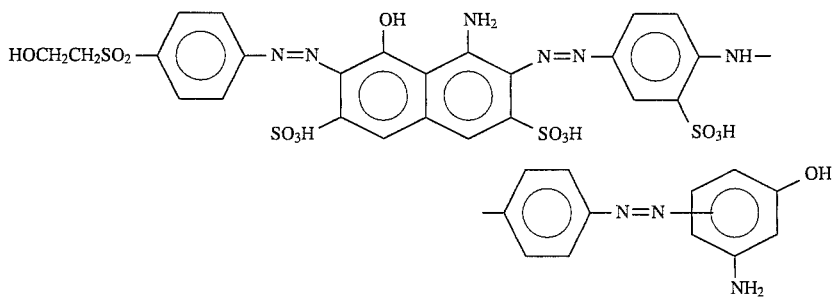

EXAMPLE 2

Example 1 was repeated, except that the 4-hydroxyethylsulfonyl-1-aminobenzene used in Example 1 was replaced with the compounds of the formula (XII) as shown in the second column of the following table. Thus, the corresponding trisazo compounds were obtained. In the table, $\lambda_{max}$ denotes the values measured in an aqueous medium.

TABLE 1

| No. | Compound of formula (XII) | $\lambda_{max}$ (nm) |
|---|---|---|
| 1 | 4-aminophenyl-SO$_2$CH$_2$CH$_2$OH | 620 |
| 2 | 4-methoxy-aminophenyl-SO$_2$CH$_2$CH$_2$OH (CH$_3$O ortho to NH$_2$) | 630 |
| 3 | NH$_2$—C$_6$H$_3$(OCH$_3$)—SO$_2$CH$_2$CH$_2$OH | 630 |
| 4 | CH$_3$O, CH$_3$ substituted aminophenyl-SO$_2$CH$_2$CH$_2$OH | 635 |
| 5 | NH$_2$—C$_6$H$_4$—SO$_2$CH$_2$CH$_2$SO$_3$H | 625 |
| 6 | OCH$_3$, NH$_2$ substituted phenyl-SO$_2$CH$_2$CH$_2$SO$_3$H | 630 |
| 7 | NH$_2$-naphthyl-SO$_2$CH$_2$CH$_2$OH | 635 |
| 8 | CH$_3$O, CH$_3$, NH$_2$ substituted phenyl-SO$_2$CH$_2$CH$_2$SO$_3$H | 630 |
| 9 | NH$_2$—C$_6$H$_3$(OCH$_3$)—SO$_2$CH$_2$CH$_2$SO$_3$H | 630 |
| 10 | SO$_3$H, NH$_2$ substituted naphthyl-SO$_2$CH$_2$CH$_2$SO$_3$H | 630 |
| 11 | NH$_2$—C$_6$H$_4$—SO$_2$CH$_2$CH$_2$SO$_3$H | 630 |

EXAMPLE 3

Example 1 was repeated, except that the 1-hydroxy-3-aminobenzene used in Example 1 was replaced with 1,3-dihydroxybenzene. Thus, a trisazo compound represented by the following formula in the free acid form was obtained. As measured in an aqueous medium, $\lambda_{max}$ of this trisazo compound was 625 nm.

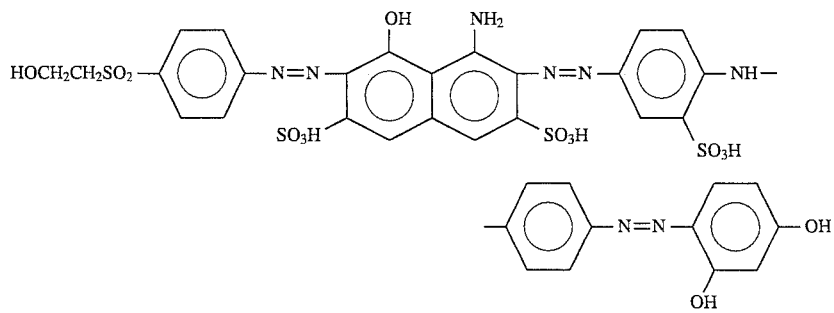

EXAMPLE 4

Example 1 was repeated, except that the 1-hydroxy-3-aminobenzene used in Example 1 was replaced with 3-amino-8-hydroxynaphthalene-6-sulfonic acid. Thus, a trisazo compound represented by the following formula in the free acid form was obtained. As measured in an aqueous medium, $\lambda_{max}$ of this trisazo compound was 630 nm.

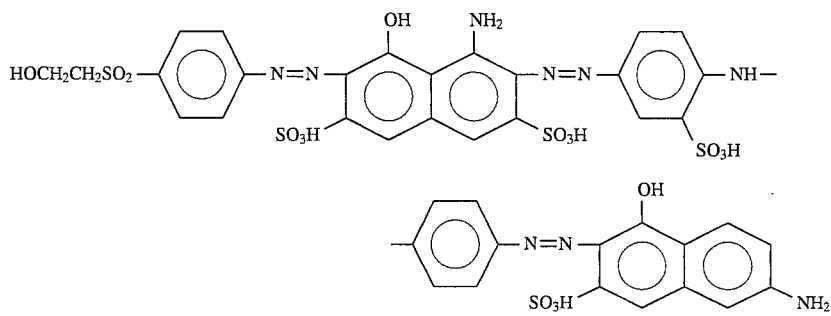

EXAMPLE 5

The trisazo compound (0.8 part) obtained in Example 1 was added into 500 parts of a LBKP 20 g/liter pulp dispersion having been beaten up to a degree of beating of CF 400 ml. After agitating the mixture for 10 minutes, 0.3 part of Sizepine E (sizing agent manufactured by Arakawa Chemical Industry, Co.) was added and the resulting mixture was agitated for 10 minutes. Then, 0.3 part of crystalline aluminum sulfate was added, and agitation was continued for 20 minutes to carry out dyeing. Then, the pulp was made into paper and dried. The paper thus prepared had a black color tone and an excellent fastness.

EXAMPLE 6

Example 1 was repeated, except that the 4-hydroxyethylsulfonyl-1-aminobenzene and 1-hydroxy-3aminobenzene used in Example 1 were replaced with the compound of the second column [a compound of formula (XII)] and the compound of the third column [a compound of formula (XIII)], respectively, of the following table. Thus, the corresponding trisazo compounds were obtained. Using the trisazo compounds obtained herein, dyeing was carried out in the same manner as in Example 5 to obtain dyed products of which color tones were as shown in the fourth column of the following table.

TABLE 2

| No. | Compound of formula (XII) | Compound of formula (XIII) | Color tone |
|---|---|---|---|
| 12 | 2-amino-4-bromo-phenyl-SO$_2$CH$_2$CH$_2$OH (NH$_2$ and Br on ring, SO$_2$CH$_2$CH$_2$OH substituent) | 1,4-dihydroxybenzene (hydroquinone) | Greenish black |
| 13 | phenyl with NH$_2$, SO$_3$H, and SO$_2$CH$_2$CH$_2$SO$_3$H substituents | 1,3-dihydroxybenzene (resorcinol) | " |
| 14 | NH$_2$—C$_6$H$_4$—SO$_2$CH$_2$CH$_2$OH | 1,3-dihydroxybenzene | " |
| 15 | " | 2-methyl-4-amino-phenol (CH$_3$, OH, NH$_2$ on ring) | Black |
| 16 | NH$_2$—C$_6$H$_4$—SO$_2$CH$_2$CH$_2$OH | 1,2,4-trihydroxybenzene (OH, OH, OH on ring) | Bluish black |
| 17 | NH$_2$—C$_6$H$_4$—SO$_2$CH$_2$CH$_2$OH | phenyl with N(C$_2$H$_5$)$_2$ and OH substituents | Black tinged with violet |
| 18 | NH$_2$—C$_6$H$_4$—SO$_2$CH$_2$CH$_2$OH | phenyl—N(C$_2$H$_4$OH)(C$_2$H$_4$CN) | Bluish black |
| 19 | NH$_2$—C$_6$H$_4$—SO$_2$CH$_2$CH$_2$OH | phenyl with NH$_2$, NH$_2$, SO$_3$H substituents | Greenish black |
| 20 | NH$_2$—C$_6$H$_4$—SO$_2$CH$_2$CH$_2$OH | phenyl with OH and COOH substituents (salicylic acid) | " |
| 21 | NH$_2$—C$_6$H$_4$—SO$_2$CH$_2$CH$_2$OH | phenyl with CH$_3$, OH, NH$_2$ substituents | Black |

TABLE 2-continued

| No. | Compound of formula (XII) | Compound of formula (XIII) | Color tone |
|---|---|---|---|
| 22 | " | 4-hydroxy-6-amino-naphthalene-2-sulfonic acid (OH, SO₃H, NH₂ on naphthalene) | Black tinged with violet |
| 23 | 3-aminophenyl-SO₂CH₂CH₂OH | 4-hydroxy-6-(methylamino)-naphthalene-2-sulfonic acid (OH, SO₃H, NHCH₃ on naphthalene) | " |
| 24 | 3-aminophenyl-SO₂CH₂CH₂OH | 4-hydroxy-6-(acetylamino)-naphthalene-2-sulfonic acid (OH, SO₃H, NHCOCH₃ on naphthalene) | " |
| 25 | " | 1-hydroxy-4-sulfonic acid naphthalene (OH, SO₃H on naphthalene) | Bluish black |
| 26 | 4-aminophenyl-SO₂CH₂CH₂OH | { resorcinol (OH, OH on benzene) 50 vs. 3-(diethylamino)phenol (N(C₂H₅)₂, OH on benzene) 50 } | Black |
| 27 | 4-aminophenyl-SO₂CH₂CH₂OH | { resorcinol (OH, OH on benzene) 55 vs. 4-hydroxy-6-amino-naphthalene-2-sulfonic acid (OH, SO₃H, NH₂ on naphthalene) 45 } | Black |

EXAMPLE 7

Example 1 was repeated, except that the 1-amino-8-naphthol-3,6-disulfonic acid used in Example 1 was replaced with 1-amino-8-naphthol-4,6-disulfonic acid. Thus, a trisazo compound represented by the following formula in the free acid form was obtained. As measured in an aqueous medium, $\lambda_{max}$ of this trisazo compound was 620 nm.

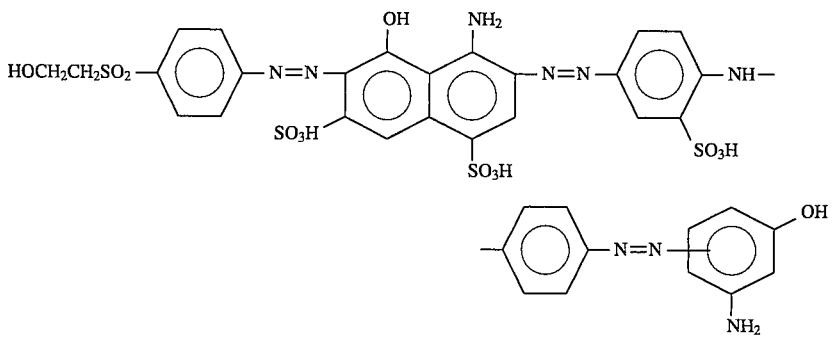

EXAMPLE 8

A dyeing bath was prepared by dissolving 0.25 part of the trisazo compound obtained in Example 1 into 200 parts of water. In the dyeing bath was dipped 5.0 parts of viscose rayon staple fiber yarn. After maintaining the bath at 90° C. for 10 minutes, 0.25 part of anhydrous sodium sulfate was added, and dyeing was carried out at that temperature for 40 minutes. Then, the yarn was washed with water and dried. The dyed porduct thus obtained had a black color tone and an excellent fastness.

EXAMPLE 9

A composition of the following formulation was heated at about 50° C. with agitation to form a solution and then filtered through a Teflon filter having a pore diameter of 0.45 µm to prepare an ink.

| Trisazo compound obtained in Example 1 | 5 parts |
|---|---|
| Deionized water | 75 parts |
| Diethylene glycol | 25 parts |
| Sodium dehydroacetate | 0.05 part |

The ink thus prepared was sealed in a glass container and left standing for a long period of time at 20° C. and 50° C. After standing, the ink showed no deposition of crystalline matter, demonstrating a high stability of its quality. Using the ink thus obtained, an ink jet recording was carried out on a commercially available high quality paper by means of recording apparatus equipped with an On-Demand type recording head discharging an ink by the action of a piezoelectric vibrator. No clogging of nozzle took place even after continuing the recording for a long period of time. The image thus formed was excellent in water-resistance, light-resistance, color depth and clarity.

EXAMPLE 10

An ink was prepared from the following composition by the same procedure as in Example 9.

The trisazo compound obtained in

| Example 2 (No. 11) | 5 parts |
|---|---|
| Deionized water | 70 parts |
| Triethylene glycol | 5 parts |
| Polyethylene glycol (molecular weight 200) | 20 parts |
| Sodium dehydroacetate | 0.05 part |

Using the ink thus prepared, an ink jet recording was carried out by the same procedure as in Example 9. The result was similar to that in Example 9.

EXAMPLE 11

An ink was prepared from the following composition by the same procedure as in Example 9.

The trisazo compound obtained in

| Example 2 (No. 1) | 3 parts |
|---|---|
| Deionized water | 84 parts |
| Diethylene glycol | 10 parts |
| Glycerin | 3 parts |
| Sodium dehydroacetate | 0.1 part |

Using the ink thus prepared, an ink jet recording was continuously carried out by the same procedure as in Example 9. As the result, no clogging of nozzle took place and an image of good performances was obtained.

EXAMPLE 12

A composition of the following formulation was heated at 50° C. with agitation to form a solution and then filtered through a Teflon filter having a pore diameter of 0.45 µm to prepare an ink.

The trisazo compound obtained in

| Example 2 (No. 2) | 5 parts |
|---|---|
| Deionized water | 75 parts |
| Diethylene glycol | 25 parts |
| Sodium dehydroacetate | 0.05 part |

The ink thus prepared was sealed in a glass container and left standing for a long period of time at 20° C. and 50° C. After standing, the ink showed no deposition of crystalline matter, demonstrating a high stability of its quality.

Using the ink, an ink jet recording was carried out on a commercially available high quality paper by means of the so-called bubble jet type recording apparatus discharging an ink by the action of thermal energy. No clogging of nozzle took place even after continuing the recording for a long period of time. The image thus obtained was good in water-resistance, light-resistance, color depth and clarity.

EXAMPLE 13

An ink was prepared from the following composition by the same procedure as in Example 12. Using the ink, an ink jet recording was carried out in the same manner as in Example 12. The result was similar to that in Example 12.

The trisazo compound obtained in

| | |
|---|---|
| Example 2 (No. 4) | 5 parts |
| Deionized water | 70 parts |
| Triethylene glycol | 5 parts |
| Polyethylene glycol (molecular weight 200) | 20 parts |
| Sodium dehydroacetate | 0.05 part |

EXAMPLE 14

An ink was prepared from the following composition by the same procedure as in Example 12.

The trisazo compound obtained in

| | |
|---|---|
| Example 2 (No. 9) | 3 parts |
| Deionized water | 84 parts |
| Diethylene glycol | 10 parts |
| Glycerin | 3 parts |
| Sodium dehydroacetate | 0.1 part |

Using the ink thus prepared, an ink jet recording was continuously carried out in the same manner as in Example 12. As the result, no clogging of nozzle took place, and an image exhibiting good performances was obtained.

The trisazo compound of the present invention is excellent in solubility and gives deep colored dyed product or image when used in dyeing or printing, so that it is useful as a dye and an ink.

What is claimed is:

1. A trisazo compound represented by the following formula (I) in the free acid form:

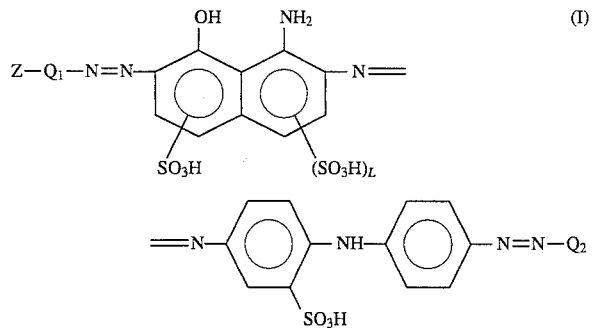

wherein $Q_1$ is an unsubstituted or substituted phenylene or naphthylene group, $Q_2$ is an unsubstituted or substituted phenyl or naphthyl group, Z is —$SO_2CH_2CH_2OH$ or —$SO_2CH_2CH_2SO_3H$ group, and L is 0 or 1, provided that when

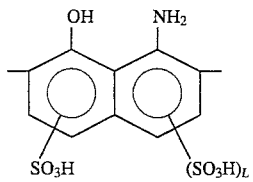

Z is —$SO_2CH_2CH_2OH$ group, $Q_2$ is the naphthyl group as defined above.

2. A trisazo compound according to claim 1, wherein $Q_1$ is a phenylene group represented by the following formula (II):

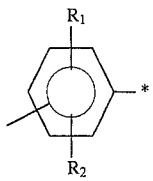

wherein $R_1$ and $R_2$ independently of one another are each hydrogen, chlorine or bromine atom or alkyl, alkoxy, sulfo or carboxy group, and * means that the bond links to an azo group.

3. A trisazo compound according to claim 1, wherein $Q_1$ is a phenylene group represented by the following formula (III):

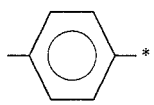

wherein * means that the bond links to an azo group.

4. A trisazo compound according to claim 1, wherein $Q_1$ is a phenylene group represented by the following formula (IV):

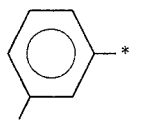

wherein * means that the bond links to an azo group.

5. A trisazo compound according to claim 1, wherein $Q_1$ is a naphthylene group represented by the following formula (V) in the free acid form:

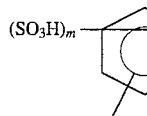

wherein m is 0, 1 or 2, and means that the bond links to an azo group.

6. A trisazo compound according to claim 1, wherein $Q_1$ is a naphthylene group represented by the following formula (VI) in the free acid form:

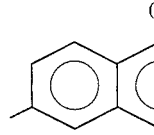

wherein n is 0 or 1, and * means that the bond links to an azo group.

7. A trisazo compound according to claim 1, wherein $Q_2$ is a phenyl group substituted once, twice or thrice by hydroxy group and additionally substituted or unsubstituted by substituted or unsubstituted amino, sulfo, alkyl, alkoxy or carboxy group.

8. A trisazo compound according to claim 1, wherein $Q_2$ is a phenyl group substituted once or twice by substituted or unsubstituted amino group and additionally substituted or unsubstituted by hydroxy, sulfo, alkyl, alkoxy or carboxy group.

9. A trisazo compound according to claim 1, wherein $Q_2$ is a phenyl group represented by the following formula (VII):

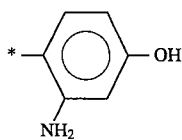

wherein * means that the bond links to an azo group, or the following formula (VIII):

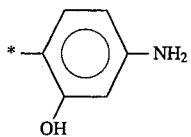

wherein * means that the bond links to an azo group.

10. A trisazo compound according to claim 1, wherein $Q_2$ is a naphthyl group substituted once or twice by hydroxy group and additionally substituted or unsubstituted by substituted or unsubstituted amino or sulfo group.

11. A trisazo compound according to claim 1, wherein $Q_2$ is a naphthyl group substituted once or twice by substituted or unsubstituted amino group and additionally substituted or unsubstituted by hydroxy or sulfo group.

12. A trisazo compound according to claim 1, wherein Z is —$SO_2CH_2CH_2SO_3H$ group.

13. A trisazo compound according to claim 1, wherein time central 1-amino-8-hydroxy-2,7-naphthylene group is 1-amino-8-hydroxy-4,6-disulfo-2,7-napthylene group.

14. A trisazo compound according to claim 1, wherein the central 1-amino-8-hydroxy-2,7-napthylene group is 1-amino-8-hydroxy-3,6-disulfo-2,7-napthylene group.

15. A trisazo compound according to claim 1, wherein the central 1-amino-8-hydroxy-2,7-napthylene group is 1-amino-8-hydroxy-3,6-disulfo-2,7-napthylene group, Z is —$SO_2CH_2CH_2OH$ group, and $Q_2$ is an unsubstituted or substituted naphthyl group.

16. A trisazo compound according to claim 1 represented by the following formula (IX) in the free acid form:

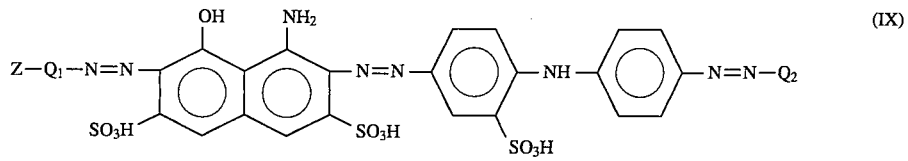

wherein $Q_1$, $Q_2$ and Z are as defined in claim 1.

17. A method for dyeing a fiber material, paper or leather which comprises applying thereto a trisazo compound according to claim 1.

* * * * *